(12) United States Patent
Penna

(10) Patent No.: US 12,466,454 B2
(45) Date of Patent: Nov. 11, 2025

(54) LAWNMOWER DECK CART

(71) Applicant: Dewayne A. Penna, West Olive, MI (US)

(72) Inventor: Dewayne A. Penna, West Olive, MI (US)

(73) Assignee: DSDD, LLC, West Olive, MI (US)

( * ) Notice: Subject to any disclaimer, the term of this patent is extended or adjusted under 35 U.S.C. 154(b) by 369 days.

(21) Appl. No.: 18/130,044

(22) Filed: Apr. 3, 2023

(65) Prior Publication Data

US 2024/0010256 A1    Jan. 11, 2024

Related U.S. Application Data

(63) Continuation-in-part of application No. 17/857,537, filed on Jul. 5, 2022, now abandoned.

(51) Int. Cl.
*B62B 1/10*   (2006.01)
*B62B 1/26*   (2006.01)

(52) U.S. Cl.
CPC ............ *B62B 1/26* (2013.01); *B62B 1/10* (2013.01); *B62B 2202/50* (2013.01); *B62B 2501/065* (2013.01)

(58) Field of Classification Search
CPC ......... B62B 1/26; B62B 1/10; B62B 2202/50; B62B 2501/065
See application file for complete search history.

(56) References Cited

U.S. PATENT DOCUMENTS

| | | |
|---|---|---|
| D203,108 S | 12/1965 | Cohen |
| 3,785,669 A | 1/1974 | Doheny |
| 3,804,432 A | 4/1974 | Lehrman |
| 4,469,341 A * | 9/1984 | Creim ............... B62B 1/10 |
| | | 280/47.28 |

(Continued)

FOREIGN PATENT DOCUMENTS

DE     202008000743     4/2008

OTHER PUBLICATIONS

Peters Enterprises, LLC, "Deck Dolly JD4x5 Assembly Instructions," https://www.deckdolly.com/support-videos-manuals/, Little Rock, Iowa (Apr. 2023).

(Continued)

*Primary Examiner* — Bryan A Evans
(74) *Attorney, Agent, or Firm* — PRICE HENEVELD LLP

(57) ABSTRACT

A cart for moving, storing, and servicing a detachable lawnmower deck includes a transverse member, an intermediate member, an outboard enclosure projection arranged orthogonally relative to the intermediate member, and an inboard enclosure projection operably arranged orthogonally relative to the intermediate member. The outboard enclosure projection and the inboard enclosure projection are parallelly disposed a predetermined distance from one another to define an inner space adapted to receive the detachable lawnmower deck. The cart also includes a handle operably coupled with a distal end of the inboard enclosure projection, and a plurality of wheels operably coupled with the cart at opposed ends of the transverse member and disposed proximate the outboard portion or the inboard portion of the intermediate member by which the cart may be moved upon a planar ground surface.

18 Claims, 12 Drawing Sheets

(56) References Cited

U.S. PATENT DOCUMENTS

| | | | |
|---|---|---|---|
| D285,019 | S | 8/1986 | Jackmore |
| D289,578 | S | 4/1987 | Ruffin |
| D332,335 | S | 1/1993 | Casad |
| 6,022,032 | A | 2/2000 | Savage |
| D423,174 | S | 4/2000 | Burr |
| 6,135,466 | A | 10/2000 | Irwin |
| D440,727 | S | 4/2001 | Keller |
| 6,386,560 | B2 | 5/2002 | Calendar |
| D465,634 | S | 11/2002 | Botzau |
| 6,860,493 | B2 | 3/2005 | Orozco |
| D532,954 | S | 11/2006 | Donaldson |
| 7,140,503 | B2 | 11/2006 | Krummell, Jr. et al. |
| 7,431,314 | B2 | 10/2008 | Donaldson |
| 7,500,681 | B2 | 3/2009 | Steadman |
| D591,024 | S | 4/2009 | Gammel |
| 7,516,855 | B2 | 4/2009 | Konstant |
| D622,471 | S | 8/2010 | Hernandez |
| 7,819,407 | B1 | 10/2010 | Charitun |
| D633,682 | S | 3/2011 | Schmid |
| D644,397 | S | 8/2011 | Wood |
| D648,755 | S | 11/2011 | Lindmeyer |
| 8,590,921 | B2 | 11/2013 | Benson et al. |
| 8,641,061 | B1 | 2/2014 | Sims |
| 9,327,952 | B1 | 5/2016 | Kolharker et al. |
| D809,237 | S | 1/2018 | Clement |
| D823,347 | S | 7/2018 | Lovely |
| D850,747 | S | 6/2019 | Zhang |
| D919,919 | S | 5/2021 | Kuhls |
| D932,724 | S | 10/2021 | Doubet |
| 11,623,676 | B2 | 4/2023 | Hall et al. |
| D1,007,801 | S | 12/2023 | Russo |
| 2007/0295682 | A1 | 12/2007 | Konstant |
| 2012/0152875 | A1 | 6/2012 | Krummell et al. |
| 2019/0047601 | A1 | 2/2019 | Murphy |

OTHER PUBLICATIONS

Peters Enterprises, LLC, "Deck Dolly JD300 Series . . . Assembly Instructions," https://www.deckdolly.com/support-videos-manuals/, Little Rock, Iowa (Apr. 2023).

Peters Enterprises, LLC, "Deck Dolly JDx7xx AutoConnect Assembly Instructions," https://www.deckdolly.com/support-videos-manuals/, Little Rock, Iowa (Apr. 2023).

Peters Enterprises, LLC, "Deck Dolly JD 2320, 2520, 2720, 2305 and others Assembly Instructions," https://www.deckdolly.com/support-videos-manuals/, Little Rock, Iowa (Apr. 2023).

Peters Enterprises, LLC, "Deck Dolly JD 1023E & 1025R AutoConnect with 54D or 60D deck Assembly Instructions," https://www.deckdolly.com/support-videos-manuals/, Little Rock, Iowa (Apr. 2023).

Peters Enterprises, LLC, "Deck Dolly 2020 and Newer JD 1023E & 1025R with 54D or 60D deck . . . Assembly Instructions," https://www.deckdolly.com/support-videos-manuals/, Little Rock, Iowa (Apr. 2023).

Peters Enterprises, LLC, "Deck Dolly JDx3xx & JDx5xx Assembly Instructions," https://www.deckdolly.com/support-videos-manuals/, Little Rock, Iowa (Apr. 2023).

Peters Enterprises, LLC, "Deck Dolly JDx7xx & JDx4xx and others Assembly Instructions," https://www.deckdolly.com/support-videos-manuals/, Little Rock, Iowa (Apr. 2023).

Peters Enterprises, LLC, "Deck Dolly Dual Wheel Addendum," https://www.deckdolly.com/support-videos-manuals/, Little Rock, Iowa (Apr. 2023).

Peters Enterprises, LLC, "Deck Dolly JDx7xx with 7 Iron Deck Assembly Instructions," https://www.deckdolly.com/support-videos-manuals/, Little Rock, Iowa (Apr. 2023).

Peters Enterprises, LLC, "Deck Dolly Universal DeckDolly Assembly Instructions," https://www.deckdolly.com/support-videos-manuals/, Little Rock, Iowa (Apr. 2023).

Peters Enterprises, LLC, "Deck Dolly Loader Dolly 200CX and 120R Loaders Assembly Instructions," https://www.deckdolly.com/support-videos-manuals/, Little Rock, Iowa (Apr. 2023).

Peters Enterprises, LLC, "Deck Dolly 47" or 54" Snowblower Throat Extension Assembly Instructions," https://www.deckdolly.com/support-videos-manuals/, Little Rock, Iowa (Apr. 2023).

Peters Enterprises, LLC, "Deck Dolly John Deere Quick Attach Loader to DeckDolly Adapter Assembly Instructions," https://www.deckdolly.com/support-videos-manuals/, Little Rock, Iowa (Apr. 2023).

* cited by examiner

LAWNMOWER DECK CART

CROSS REFERENCE TO RELATED APPLICATION

The present application is a continuation-in-part of and claims priority under 35 U.S.C. § 120 to commonly owned U.S. application Ser. No. 17/857,537, filed Jul. 5, 2022, entitled LAWNMOWER DECK CART, the entirety of which is incorporated hereby by reference.

FIELD OF THE DISCLOSURE

The present disclosure generally relates to a device for handling and storing detachable lawnmower decks and, more particularly, to a movable cart that is adapted to engage and restrain a detached lawnmower deck for movement, service, and storage, whereby the lawnmower deck is entirely accessible.

BACKGROUND OF THE DISCLOSURE

Lawnmowers, particularly riding lawnmowers, may be provided with a detachable lawnmower deck that is often attached to a lower portion of a tractor and selectively driven by a power-take off on-board the tractor. The detachable lawnmower deck may also be selectively raised and lowered relative the tractor as desired. Thus, when appropriately attached to a tractor, the detachable lawnmower deck may be readily manipulated as needed. However, when attached to the tractor, access to the lower surface of the detachable lawnmower deck and many portions of the upper surface may be difficult. Likewise, when detached from the tractor, the detachable lawnmower deck may be difficult to manipulate, particularly as such devices may weigh several hundred pounds and be several feet in diameter. Thus, manipulating the detachable lawnmower deck to perform maintenance on the detachable lawnmower deck can be difficult due to the size and/or weight of the detachable lawnmower deck. In addition, detachable lawnmower decks may require significant storage space, particularly if the detachable lawnmower deck is stored in a plane parallel to the ground. If stored upright vertical on its edge, for example, tilted against a wall, the detachable lawnmower deck may be unstable, which may be dangerous. A device to improve the ease of movement, service, and storage of detachable lawnmower decks was desired.

SUMMARY OF THE DISCLOSURE

According to a first aspect of the present disclosure, a cart for moving, servicing, and storing a detachable lawnmower deck is disclosed. The cart comprises a transverse member and an intermediate member operably coupled with the transverse member. An outboard enclosure projection may be operably coupled with an outboard portion of the intermediate member and arranged orthogonally relative to the intermediate member and an inboard enclosure projection may be operably coupled at a proximal end with the transverse member or an inboard portion of the intermediate member and arranged orthogonally relative to the intermediate member, wherein the outboard enclosure projection and the inboard enclosure projection are parallelly disposed a predetermined distance from one another to define an inner space adapted to receive the detachable lawnmower deck. A handle may be operably coupled with a distal end of the inboard enclosure projection, and a plurality of wheels may be operably coupled with the cart at opposed ends of the transverse member and disposed proximate the outboard portion or the inboard portion of the intermediate member by which the cart may be moved upon a planar ground surface.

According to another aspect of the present disclosure, a lawnmower deck cart is disclosed, and comprises a plurality of inboard tubular members adapted to receive a detachable lawnmower deck thereon, and a plurality of outboard tubular members disposed a first distance away from the plurality of inboard tubular members to receive the lawnmower deck thereon, such that the detachable lawnmower deck is disposed between the plurality of inboard tubular members and the plurality of outboard tubular members. A plurality of wheels may be disposed on at least a portion of the inboard tubular members to facilitate movement of the plurality of inboard tubular members and the plurality of outboard tubular members while the plurality of wheels are disposed on a planar ground surface. A handlebar may be disposed on the plurality of inboard tubular members to facilitate gripping thereof.

According to yet another aspect of the present disclosure, a method of moving, servicing, or storing a detachable lawnmower deck is disclosed, wherein the detachable lawnmower deck comprising a plurality of wheels upon which the detachable lawnmower deck may be rolled over a planar ground surface. The method comprises the steps of providing a cart having a transverse member, a pair of intermediate members operably coupled with the transverse member, a pair of outboard enclosure projections operably coupled with an outboard portion of the intermediate member and arranged orthogonally relative to the intermediate member, and a pair of inboard enclosure projections operably coupled at a proximal end with the transverse member or a inboard portion of the intermediate member and arranged orthogonally relative to the intermediate member proximate the detachable lawnmower deck, wherein the outboard enclosure projection and the inboard enclosure projection are parallelly disposed a predetermined distance from one another to define an inner space adapted to receive the detachable lawnmower deck. The method further comprises the steps of: placing the cart on a first side, wherein the pair of outboard enclosure projections is proximate to and parallel with the planar ground surface; rolling the detachable lawnmower deck over the pair of outboard enclosure projections and into the inner space adapted to receive the detachable lawnmower deck until the detachable lawnmower deck is proximate the pair of intermediate members; lifting a handle operably coupled with a distal end of the pair of inboard enclosure projections until the cart is in an upright vertical position; and moving the detachable lawnmower deck and the cart upon the planar ground surface via the handle and a plurality of wheels operably coupled with the cart at opposed ends of the transverse member and disposed proximate the inboard edge of the pair of intermediate members.

These and other features, advantages, and objects of the present disclosure will be further understood and appreciated by those skilled in the art by reference to the following specification, claims, and appended drawings.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

Figure 1:
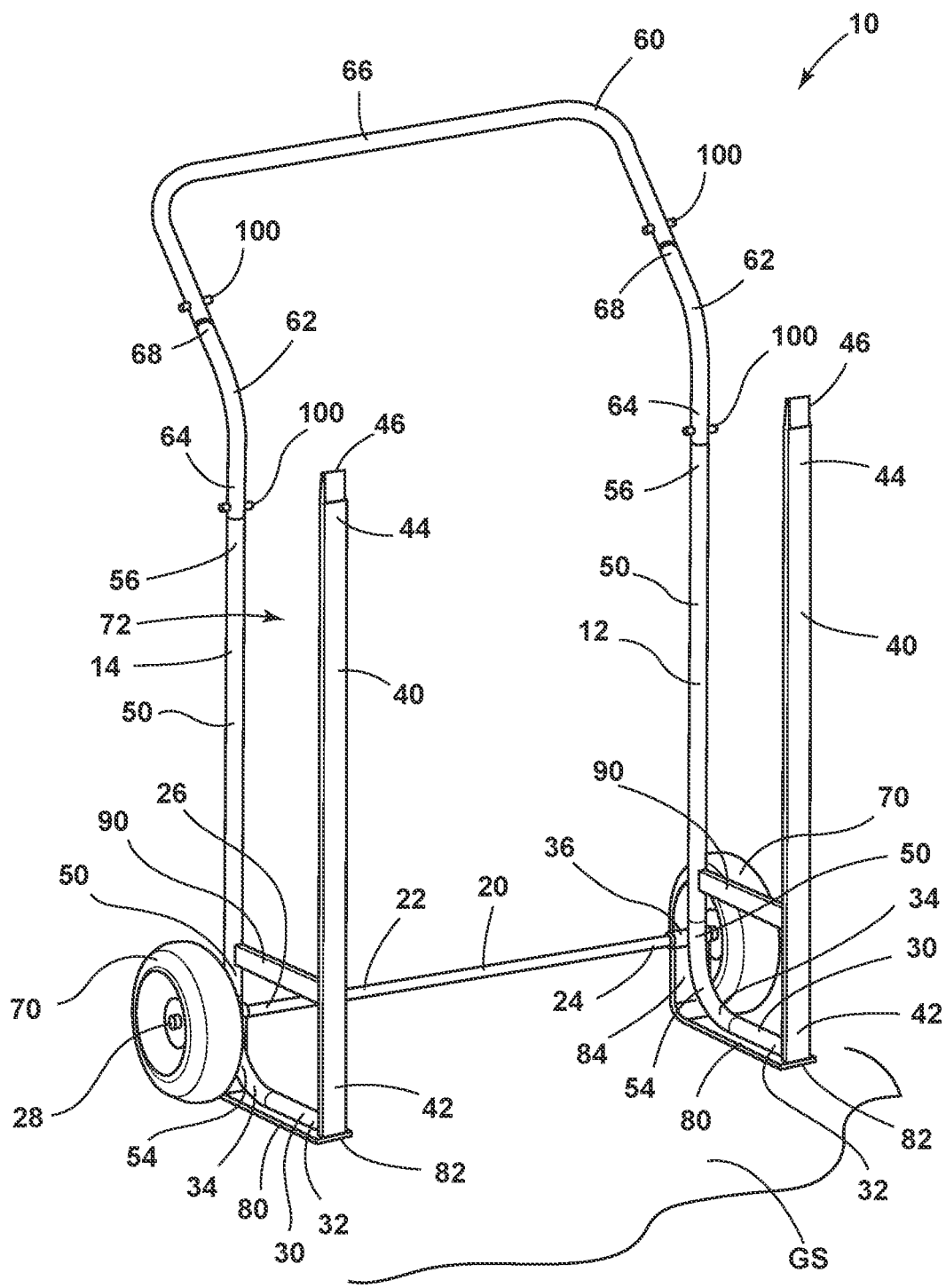
FIG. 1 is a top side perspective view of the detachable lawnmower deck cart according to at least one aspect of the present disclosure.
Figure 2:
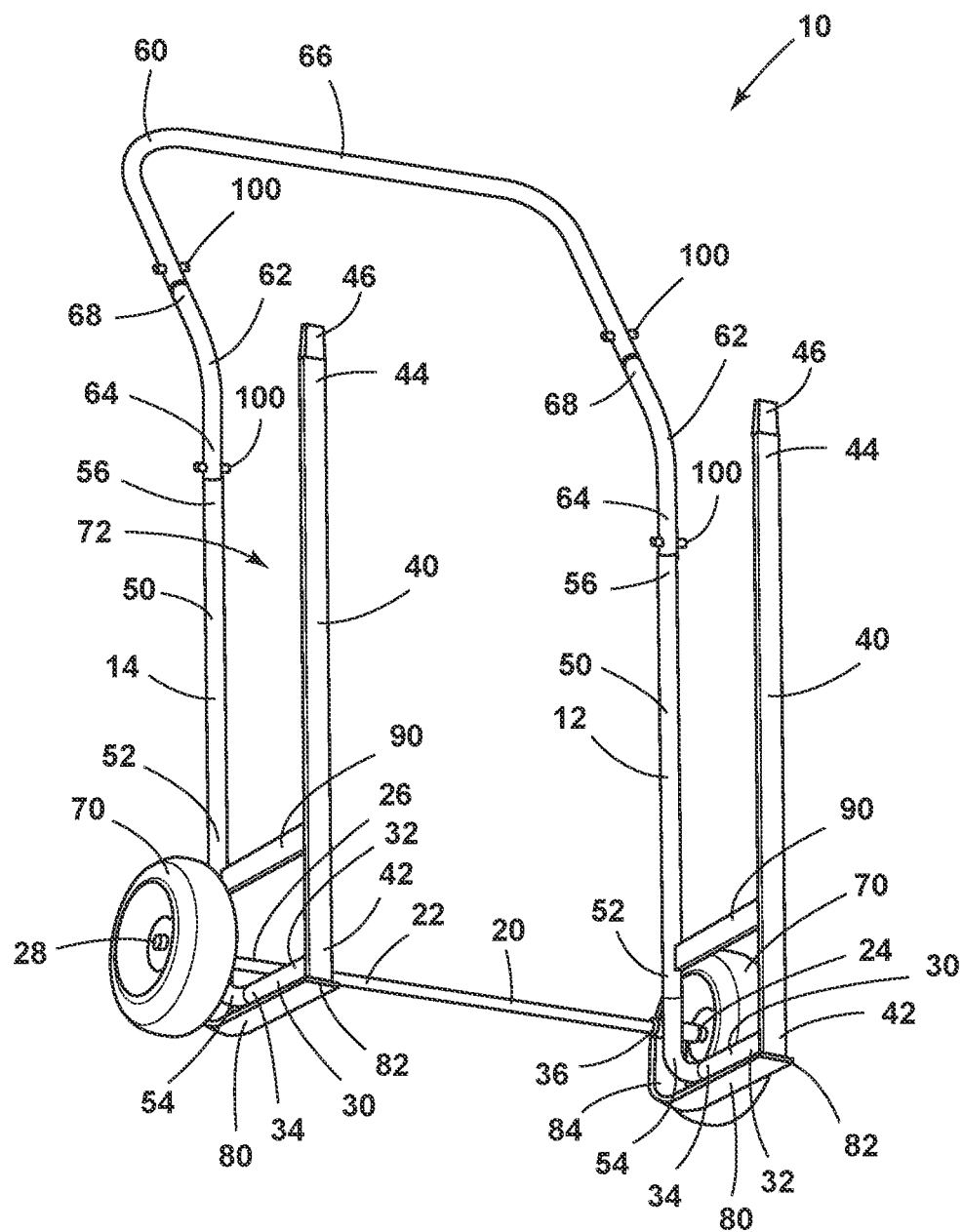
FIG. 2 is a bottom side perspective view of the detachable lawnmower deck cart according to at least one aspect of the present disclosure.

The components in the figures are not necessarily to scale, emphasis instead being placed upon illustrating the principles described herein.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "inboard," "outboard," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cart for moving, servicing, and storing a detachable lawnmower deck. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected," "coupled," or "operably coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. Thus, for example, reference to "a component" includes embodiments having two or more such components unless the context clearly indicates otherwise.

It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Referring generally to FIGS. 1-11, a cart for moving, servicing, and storing a detachable lawnmower deck MD is generally indicated at 10. While the detachable lawnmower deck cart 10 may be constructed from a variety of materials such as metal, plastic, wood, and rubber, etc., the construction of the detachable lawnmower deck cart 10 is not limited thereto.

Figure 3:
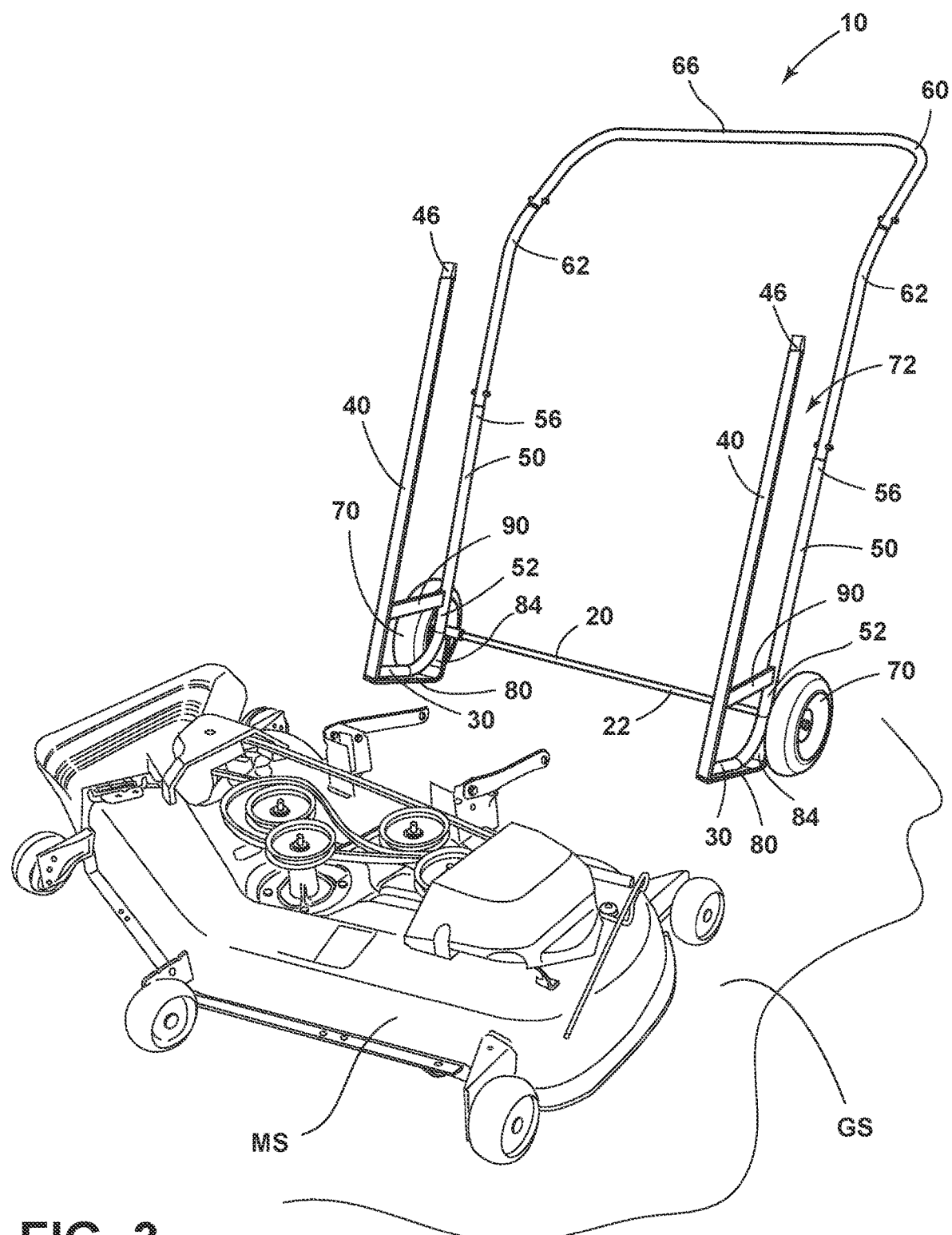
FIG. 3 is a top side perspective view of the detachable lawnmower deck cart of FIGS. 1 and 2 and a detachable lawnmower deck resting on a planar ground surface according to at least one aspect of the present disclosure.
Figure 4:
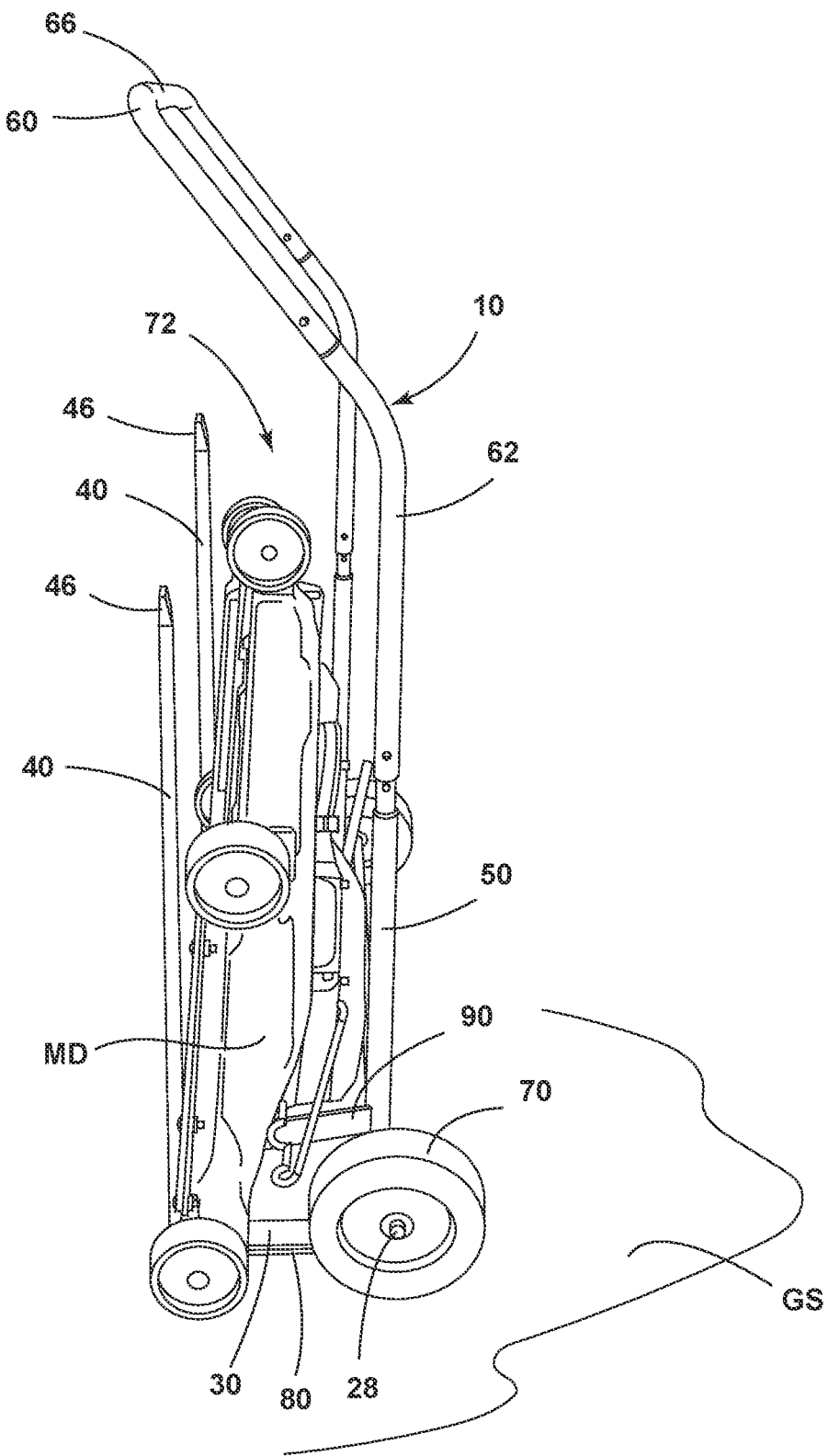
FIG. 4 is a side view of the detachable lawnmower deck cart of FIGS. 1 and 2 and a detachable lawnmower deck received within an inner space of the detachable lawnmower deck cart according to at least one aspect of the present disclosure.
Figure 5:
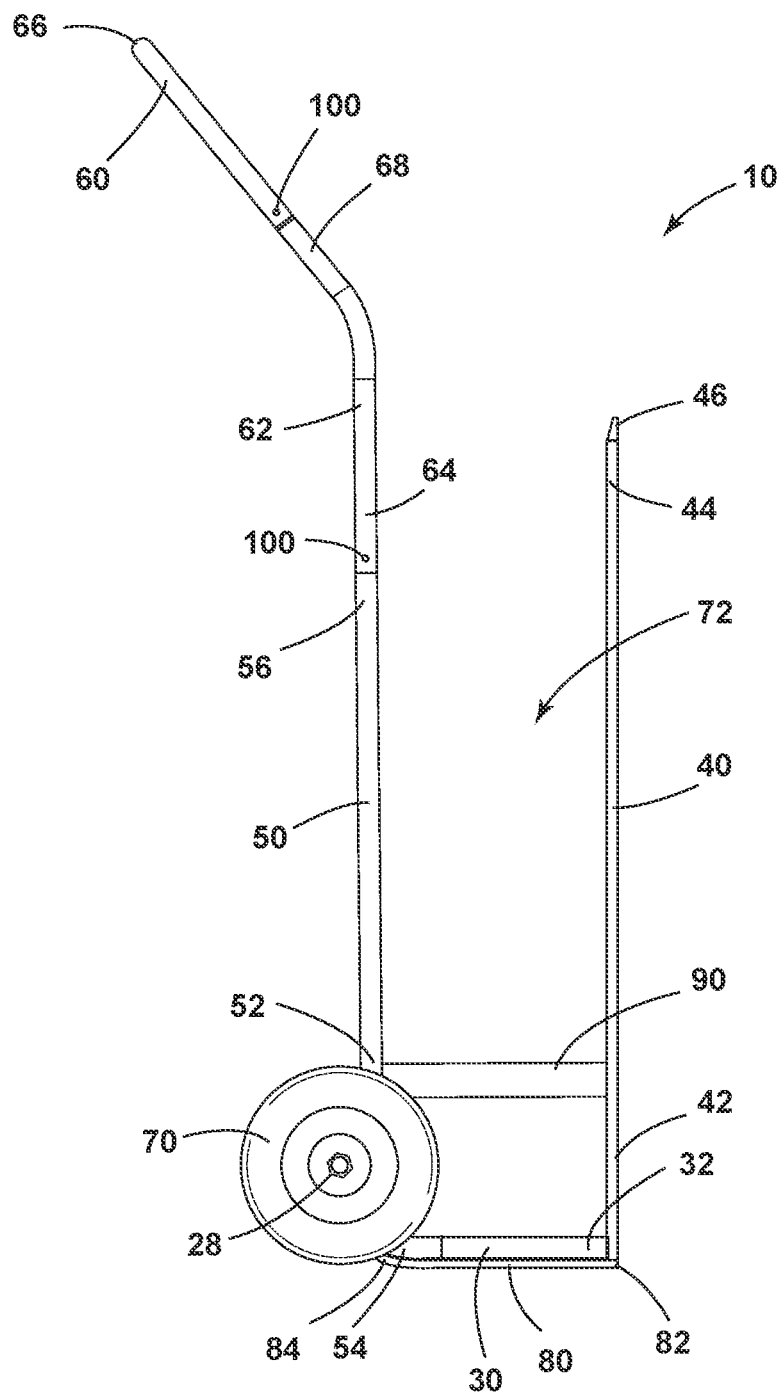
FIG. 5 is a side view of the detachable lawnmower deck cart of FIGS. 1 and 2 according to at least one aspect of the present disclosure.

A detachable lawnmower deck of the type for which the detachable lawnmower deck cart 10 might be used may be seen in FIGS. 3 and 4. In FIG. 3, the detachable lawnmower deck MD includes a substantially flat clam-shell configuration beneath which are situated one or more lawn cutting blades (not shown). A plurality of gauge wheels GW may be situated about the perimeter of the clam-shell configuration. When attached to the tractor (not shown), the plurality of gauge wheels GW may be used to set the height of the grass to be cut. When detached from the tractor, the plurality of gauge wheels GW supports the detachable lawnmower deck MD, which may also then be rolled about upon a planar ground surface GS. In FIG. 4, the detachable lawnmower deck MD is shown disposed within the detachable lawnmower deck cart 10, wherein the detachable lawnmower deck MD may be conveniently moved, serviced from both its upper and lower surface, and stored.

The detachable lawnmower deck cart 10 may include, generally, a transverse member 20, an intermediate member 30, an outboard enclosure projection 40, and an inboard enclosure projection 50. The detachable lawnmower deck cart 10 may also include a handle 60 and a pair of wheels 70. As shown in FIGS. 1-11, the detachable lawnmower deck cart 10 may include a pair of spaced apart intermediate members 30, a pair of spaced apart outboard enclosure projections 40, and a pair of spaced apart inboard enclosure projections 50.

As shown in FIGS. 1-11, the transverse member 20, the intermediate member 30, the outboard enclosure projection 40, and the inboard enclosure projection 50 of the detachable lawnmower deck cart 10 may include a plurality of interlocking tubular members, but is not limited thereto. That is, each of the interlocking tubular members may be constructed from at least one first tube to connect to at least one second tube. Each of the plurality of inboard tubular members may be a single tube and/or a plurality of interconnected tubes, unless described otherwise. In addition, the interlocking tubular members are illustrated to have a cylindrical shape. However, the plurality of interlocking tubular members may be rectangular, triangular, pentagonal, hexagonal, heptagonal, octagonal, or any other shape known to one of ordinary skill in the art but are not limited thereto.

As shown in FIG. 1, the transverse member 20 may comprise a simple axle 22 that extends between opposed sides 12, 14 of the detachable lawnmower deck cart 10. The axle 22 may be fabricated from steel with a threaded portion at opposed ends 24, 26 upon which one of the pair of wheels 70 may attached and secured in place via a fastener, such as a threaded nut 28, as is known in the art. The plurality of wheels 70 may be thus operably coupled with the detachable lawnmower deck cart 10 at the opposed ends 24, 26 of the transverse member 20 and disposed proximate the outboard portion 32 or the inboard portion 34 of the pair of intermediate members 30, by which the detachable lawnmower deck cart 10 may be moved upon the planar ground surface GS. The wheels 70 for the detachable lawnmower deck cart 10 may consist of solid rubber wheels 70 having dimensions of 2.5 inches wide and 10 inches in diameter, with an internal bearing size of about 16 mm.

As shown in the Figures, the transverse member 20 is disposed proximate the inboard portion 34 of the pair of intermediate members 30 and is operably coupled therewith via a pair of bearings 36 fixedly attached thereto. The pair of intermediate members 30 may be operably coupled with the transverse member 20, as further described below. Alternatively, the inboard enclosure projection 50 may be operably coupled at a proximal end 52 with the transverse member 20 and arranged orthogonally relative to the intermediate member 30.

As shown in FIGS. 1-11, one each of the pair of spaced apart inboard enclosure projections 50 may be operably coupled at the proximal end 52 with the inboard portion 34 of one of the pair of intermediate members 30. As perhaps best seen in FIGS. 8 and 9, each of the pair of spaced apart intermediate members 30 and the pair of spaced apart inboard enclosure projections 50 comprise a single integral tubular member bent at a right-angle bend 54 to form an orthogonal pair of spaced apart intermediate members 30 and spaced apart inboard enclosure projections 50.

Referring again to FIGS. 8 and 9, a right-angle member 80 may be disposed proximate the right-angle bend 54 to provide structural rigidity to the detachable lawnmower deck cart 10 and provide a relatively flat structure upon which and by which the detachable lawnmower deck cart 10 may be placed in an upright vertical (e.g., standing) orientation relative the planar ground surface GS, as shown in FIG. 4. The right-angle member 80 may be attached at a first end 82 to the outboard portion (or distal end) 32 of one of the pair of spaced apart intermediate members 30 and/or the spaced apart outboard enclosure projections 40 and attached at a second end 84 to one of the pair of spaced apart inboard enclosure projections 50. As shown, the right-angle member 80 is attached at the first end 82 to the outboard portion 32 of one of the pair of spaced apart intermediate members 30, as well as the spaced apart outboard enclosure projections 40.

The bearings 36 for the axle 22 may be seen disposed proximate the right-angle member 80 and proximate the proximal end 52 of the one of the pair of spaced apart inboard enclosure projections 50 through which the axle 22 is mounted to the spaced apart inboard enclosure projections 50. As shown, the bearings 36 for the axle 22 may be situated proximate the planar ground surface GS, such that tilting the detachable lawnmower deck cart 10 backwards, toward the inboard enclosure projections 50, at an angle with respect to the planar ground surface GS, will raise up the outboard portion 32 of the intermediate members 30, and the detachable lawnmower deck MD, if present, so that the detachable lawnmower deck cart 10 is completely supported on the wheels 70, thus allowing the detachable lawnmower deck cart 10 to be conveniently moved. The bearings 36 for the axle 22 may comprise a simple collar-type bearing. It is further contemplated that roller bearings may also be employed. Also, it is contemplated that the bearings 36 for the axle 22 may formed integral with the second end 84 of the right-angle member 80 to simplify assembly.

As noted above, the pair of outboard enclosure projections 40 may be each operably coupled with an outboard portion (or distal end) 32 of the intermediate member 30 and arranged orthogonally relative to the intermediate member 30. The pair of outboard enclosure projections 40 also may be each operably coupled with the right-angle member 80, as discussed above. So situated, the pair of outboard enclosure projections 40 and the pair of inboard enclosure projections 50 are parallelly disposed a predetermined distance from one another to define an inner space 72 adapted to receive the detachable lawnmower deck MD, as shown in FIG. 4.

The pair of outboard enclosure projections 40 may each comprise tubular members operably coupled at a proximal end 42 to a one of the pair of spaced apart intermediate members 30 and/or the first end 82 of the right-angle member 80. The pair of outboard enclosure projections 40 may each also have a free distal end 44. The tubular members of the pair of outboard enclosure projections 40 may have a rectangular cross-sectional configuration, where the free distal end 44 comprises an inclined end cap 46, as shown in FIG. 4, to facilitate loading the detachable lawnmower deck MD onto the detachable lawnmower deck cart 10, as described below in more detail. The tubular members of the pair of outboard enclosure projections 40 may be fabricated from aluminum and the inclined end cap 46 may be fabricated from a polymeric material, such as acetal homopolymer.

To further stabilize the detachable lawnmower deck MD situated on the detachable lawnmower deck cart 10, a pair of stabilizing members 90 may be provided. Each of the pair of stabilizing members 90 may extend between one of the pair of outboard enclosure projections 40 and the pair of inboard enclosure projections 50, as shown in FIGS. 1-11. The pair of stabilizing members 90 may likewise comprise tubular members and may include a cushion and/or foam upon which the detachable lawnmower deck MD may be supported when the detachable lawnmower deck MD is in the upright vertical position, as shown in FIG. 4. Thus, each of the pair of stabilizing members 90 may absorb an impact thereon, such that the pair of stabilizing members 90 may prevent damage to the detachable lawnmower deck MD disposed thereon. The vertical height of each of the pair of outboard enclosure projections 40 above each of the pair of stabilizing members 90 may be at least 34 inches, which has been determined to provide improved stability of the detachable lawnmower deck MD situated on the detachable lawnmower deck cart 10.

The pair of spaced apart inboard enclosure projections 50 also each comprise tubular members operably coupled at the proximal end 52 to a one of the pair of spaced apart intermediate members 30. An upper distal end 56 of the pair of spaced apart inboard enclosure projections 50 is provided with a slightly reduced outer diameter, as disclosed below.

Figure 6:
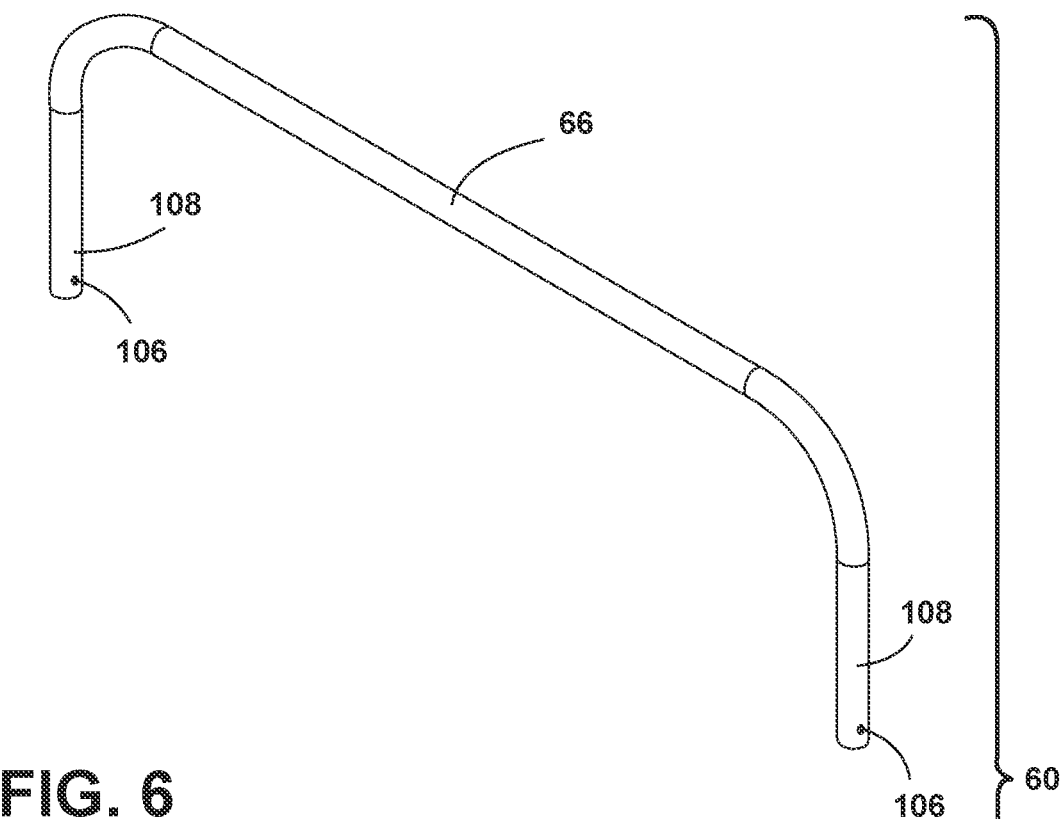
FIG. 6 is a perspective view of a U-shaped portion of a handle of the detachable lawnmower deck cart of FIGS. 1 and 2 in a detached condition according to at least one aspect of the present disclosure.
Figure 7:
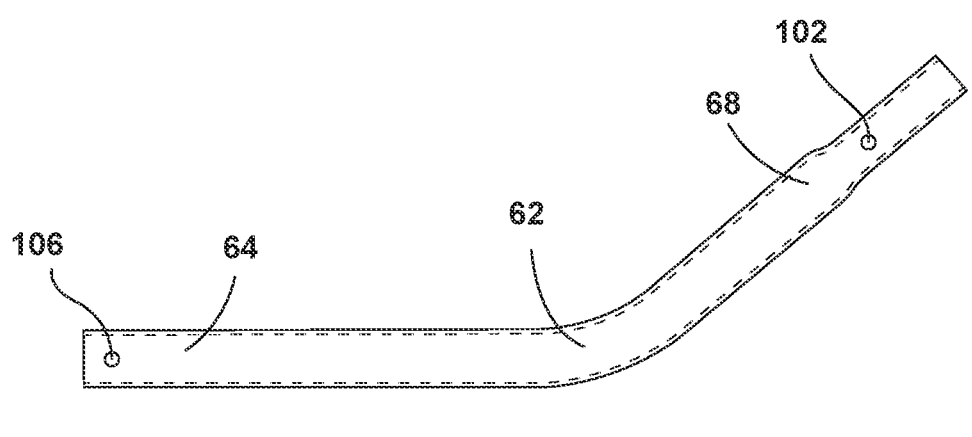
FIG. 7 is a side view of an angled portion of the handle of the detachable lawnmower deck cart of FIGS. 1 and 2 in a detached condition according to at least one aspect of the present disclosure.

The handle 60 is best seen in FIGS. 6 and 7 and includes a pair of tubular angled portions 62 each directly and detachably coupled with a slightly reduced outer diameter of the upper distal end 56 of the pair of inboard enclosure projections 50 at a first end 64. The handle 60 also includes a U-shaped tubular portion 66 extending between and detachably coupled with a slightly reduced outer diameter of a second end 68 of each of the pair of angle portions 62.

Figure 11:
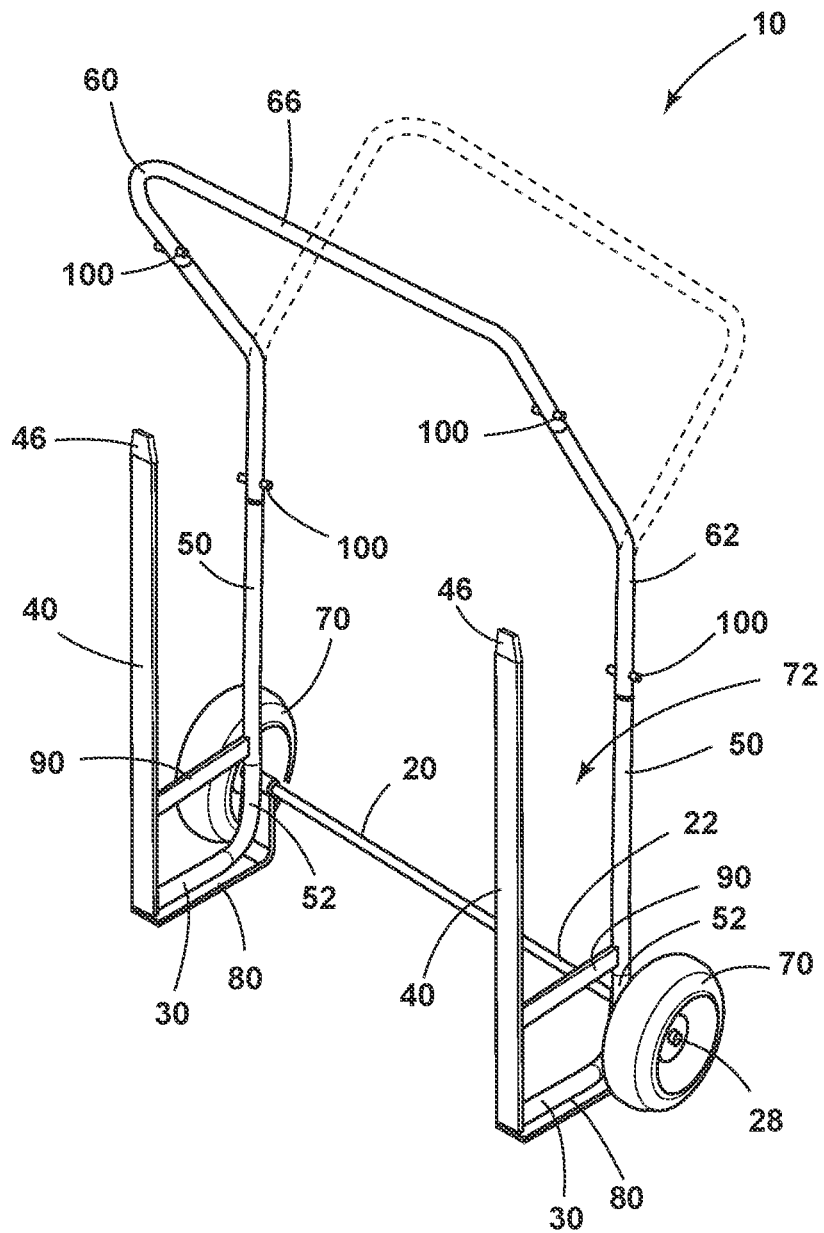
FIG. 11 is a perspective side view of the handle mounted in an outboard leaning position (shown) and an inboard leaning position (phantom) on the detachable lawnmower deck cart of FIGS. 1 and 2 according to at least one aspect of the present disclosure.

As best shown in FIG. 11, the handle 60 may be reversibly mounted on the upper distal end 56 of the pair of inboard enclosure projections 50. That is, the handle 60 may be selectively oriented in an inboard leaning position, as shown in solid view in FIG. 11, or the handle 60 may be selectively oriented in an outboard leaning position, as shown in phantom in FIG. 11. When in the inboard leaning position, the handle 60 may be disposed above the detachable lawnmower deck MS when in the upright vertical position, thereby substantially minimizing space required for storage of the detachable lawnmower deck cart 10 and the detachable lawnmower deck MD disposed thereon. Alternatively, when in the outboard leaning position, the detachable lawnmower deck MD may be readily received within the inner space 72 between the pair of outboard enclosure projections 40 and the pair of inboard enclosure projections 50, as further discussed below. In addition, the handle 60 in the outboard leaning position may assist in tilting the detachable lawnmower deck cart 10 backwards, toward the inboard enclosure projections 50, to raise up the outboard portion 32 of the intermediate members 30, such that the lawnmower deck cart 10 is completely supported on the wheels 70 and the detachable lawnmower deck cart 10 may be conveniently moved.

Figure 10:
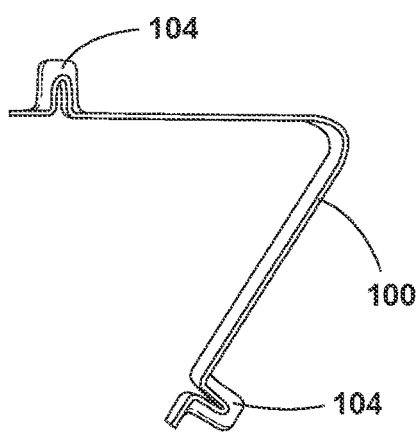
FIG. 10 is a side view of a double button straight leg button pin by which the handle may be mounted on the detachable lawnmower deck cart of FIGS. 1 and 2 according to at least one aspect of the present disclosure.

To facilitate the ready removal and re-orientation of the handle 60, the handle 60 may include a plurality of double button straight leg button pins 100, as shown in FIG. 10. The plurality of double button straight leg button pins 100 may be disposed at each of the interfaces between the pair of angled portions 62 and the pair of inboard enclosure projections 50 and the U-shaped portion 66 detachably coupled with the second end 68 of each of the pair of angle portions 62. The double button straight leg button pins 100 may be purchased from McMaster-Carr as Part No. 94282A350 and may be fabricated from spring steel.

Figure 8:
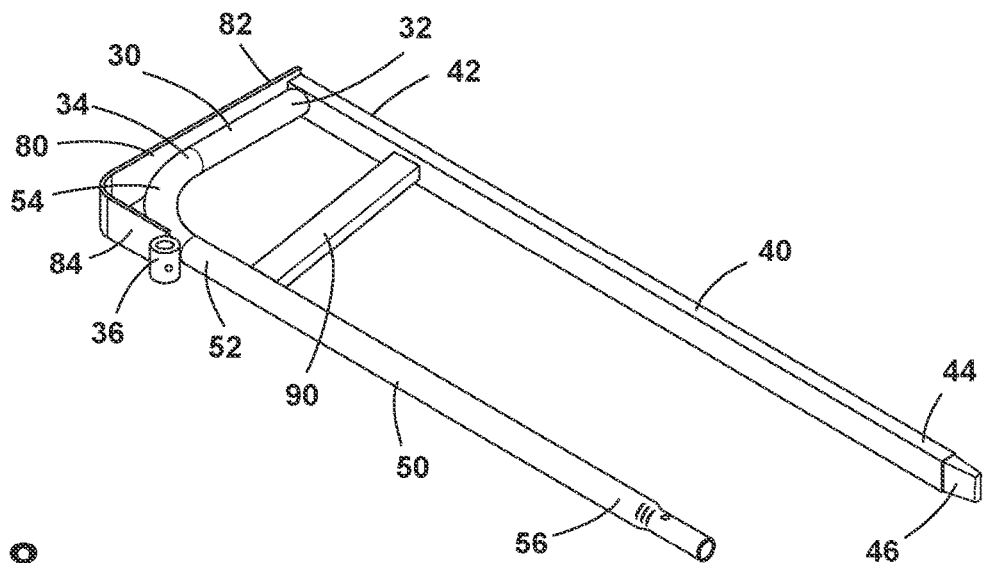
FIG. 8 is a perspective side view of an intermediate member, an outboard enclosure projection, and an inboard enclosure projection of the detachable lawnmower deck cart of FIGS. 1 and 2 according to at least one aspect of the present disclosure.
Figure 9:
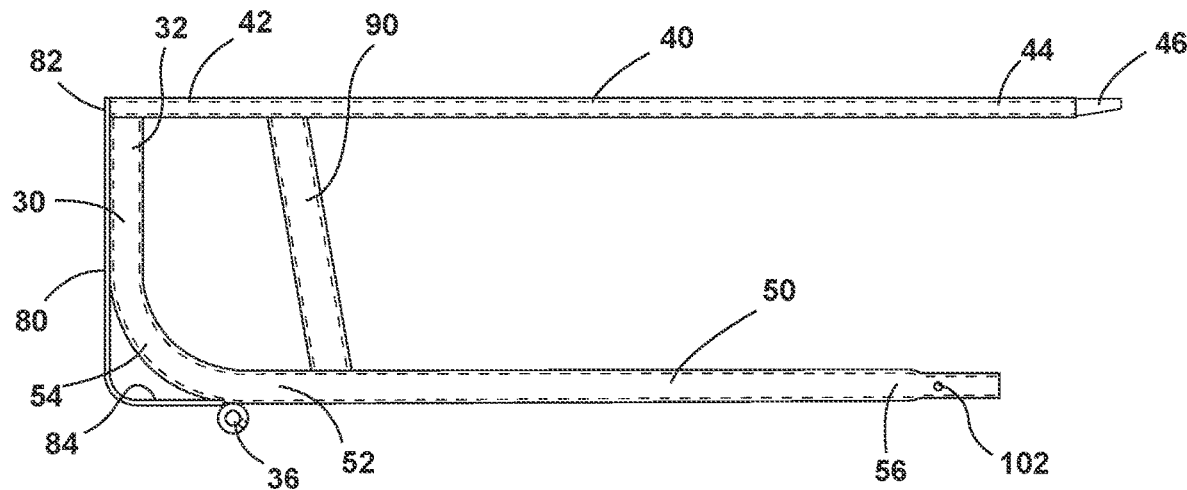
FIG. 9 is a side view of the intermediate member, the outboard enclosure projection, and the inboard enclosure projection of the detachable lawnmower deck cart of FIGS. 1 and 2 according to at least one aspect of the present disclosure.

One of the double button straight leg button pins 100 may be inserted into the tubular configuration of each of the distal end 56 of the pair of inboard enclosure projections 50 and the second end 68 of each of the pair of angle portions 62. As shown in FIGS. 6 and 7, openings 102 may be provided in each of distal end 56 of the pair of inboard enclosure projections 50 and the second end 68 of each of the pair of angle portions 62 to through which one of the buttons 104 of the double button straight leg button pins 100 may be received. Additionally, as shown in FIGS. 7 and 8, a corresponding opening 106 may be provided on the first end 64 of the each of the pair of angle portions 62 and a pair of coupling ends 108 of the U-shaped portion 66. As the components are assembled, the buttons 104 may be initially pushed inward, but spring back to a locked position as the openings 102 and 106 become aligned, thus locking the components together. When the components are to be disassembled, the buttons 104 may be simply depressed to push the buttons 104 out of and retract from the openings 106, allowing the components to be separated. When released, the buttons 104 spring back to the locked position.

Prior to use, the detachable lawnmower deck MD may be detached from the tractor. The detachable lawnmower deck cart 10 may than be placed on a first side proximate the detachable lawnmower deck MD, wherein the pair of outboard enclosure projections 40 is proximate to and parallel with the planar ground surface GS. The detachable lawnmower deck MD may be then rolled over the planar ground surface GS, via the plurality of gauge wheels GW, toward and over the pair of outboard enclosure projections 40 and into the inner space 72 adapted to receive the detachable lawnmower deck MD, until the detachable lawnmower deck MD abuts the pair of stabilizing members 90 and is proximate the pair of intermediate members 30.

Once so situated, an operator may then simply lift the handle 60, which may be in the outboard leaning position shown in FIG. 3, until the detachable lawnmower deck cart 10 is in an upright vertical position. Thus, the detachable lawnmower deck MD and the detachable lawnmower deck cart 10 may then be moved upon the planar ground surface GS via the handle 60 and the plurality of wheels 70 operably coupled with the detachable lawnmower deck cart 10 at opposed ends 24, 26 of the transverse member 20 and disposed proximate the inboard portion 34 of the pair of intermediate members 30. That is, by tilting the handle 60 and the pair of plurality of inboard enclosure projections 50 at an angle with respect to the planar ground surface GS, the plurality of wheels 70 may be used to facilitate movement of the detachable lawnmower deck MD and the detachable lawnmower deck cart 10.

Further, once in the upright vertical position, as the handle 60 may be reversibly mounted on the upper distal end 56 of the pair of inboard enclosure projections 50, an operator may selectively orient the handle 60 in an inboard leaning position (as shown in FIG. 3) for movement of the detachable lawnmower deck MD or selectively orient the handle 60 in an outboard leaning position (as shown in FIG. 4) for storage of the detachable lawnmower deck MD.

Thus, as has been disclosed, the plurality of inboard enclosure projections (or inboard tubular members) 50 and the plurality of outboard enclosure projections (or outboard tubular members) 40 may store the detachable lawnmower deck MD and thereby improve storage space. The detachable lawnmower deck cart MD may be moved to a loading position (e.g., in parallel with the planar ground surface GS) to facilitate placing the detachable lawnmower deck MD within the detachable lawnmower deck cart 10. Subsequently, the detachable lawnmower deck cart 10 may be moved to an upright vertical position, such that the plurality of inboard enclosure projections 50 and outboard enclosure projections 40 may be perpendicular to the planar ground surface GS to facilitate moving, servicing, and storing the detachable lawnmower deck MD.

Figure 12:
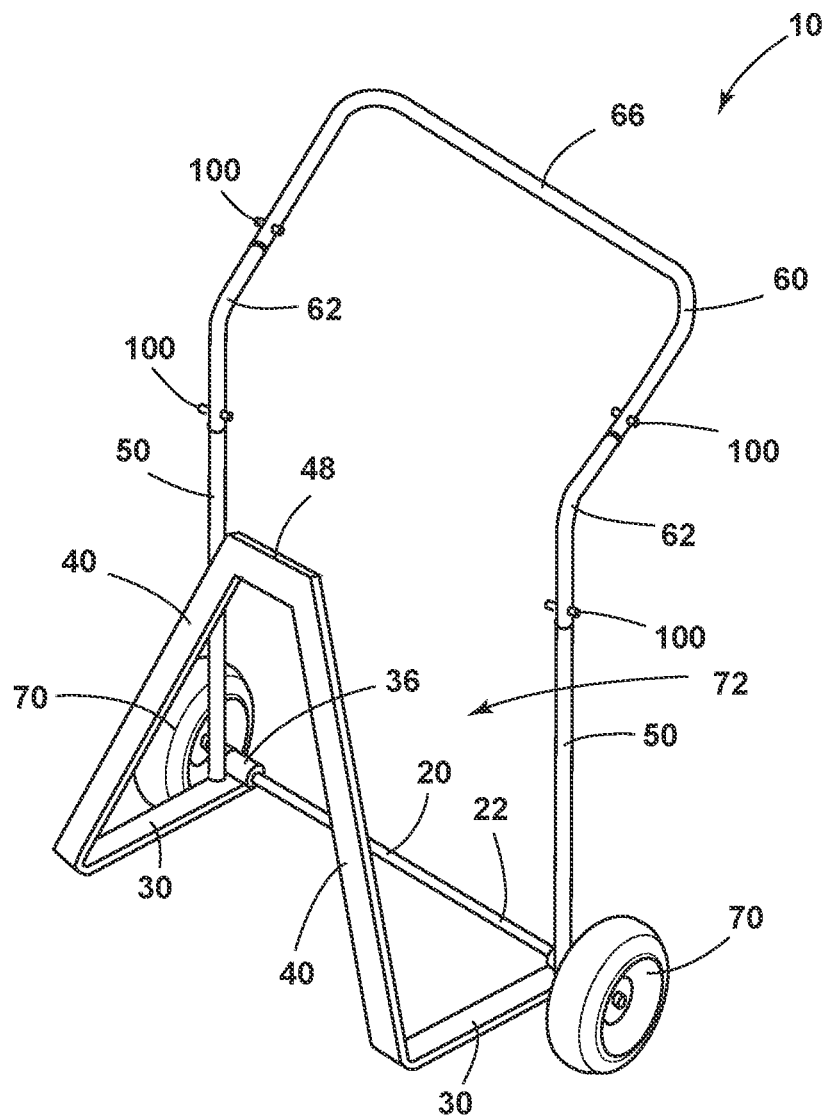
FIG. 12 is a top side perspective view of the detachable lawnmower deck cart according to still another aspect of the present disclosure.

Referring to FIG. 12, an additional embodiment of the detachable lawnmower deck cart 10 may be seen. In this embodiment, similar structures are designated with similar reference characters. However, in the case of the additional embodiment of the detachable lawnmower deck cart 10 seen in FIG. 12, the pair of outboard enclosure projections 40 has been modified so that the pair of outboard enclosure projections 40 do not include a distal end 44 that is free. Rather, the pair of outboard enclosure projections 40 comprises a pair of tubular members, where one each of the pair of tubular members extends orthogonally from the outboard portion 32 of one of the pair of spaced apart intermediate members 30 and inwardly at an angle relative the planar ground surface GS, whereby the distal end 44 of the pair of tubular members is joined. In the embodiment of FIG. 12, a tubular cross-member 48 operably couples the distal end 44 of each of the pair of outboard enclosure projections 40.

Figure 13:
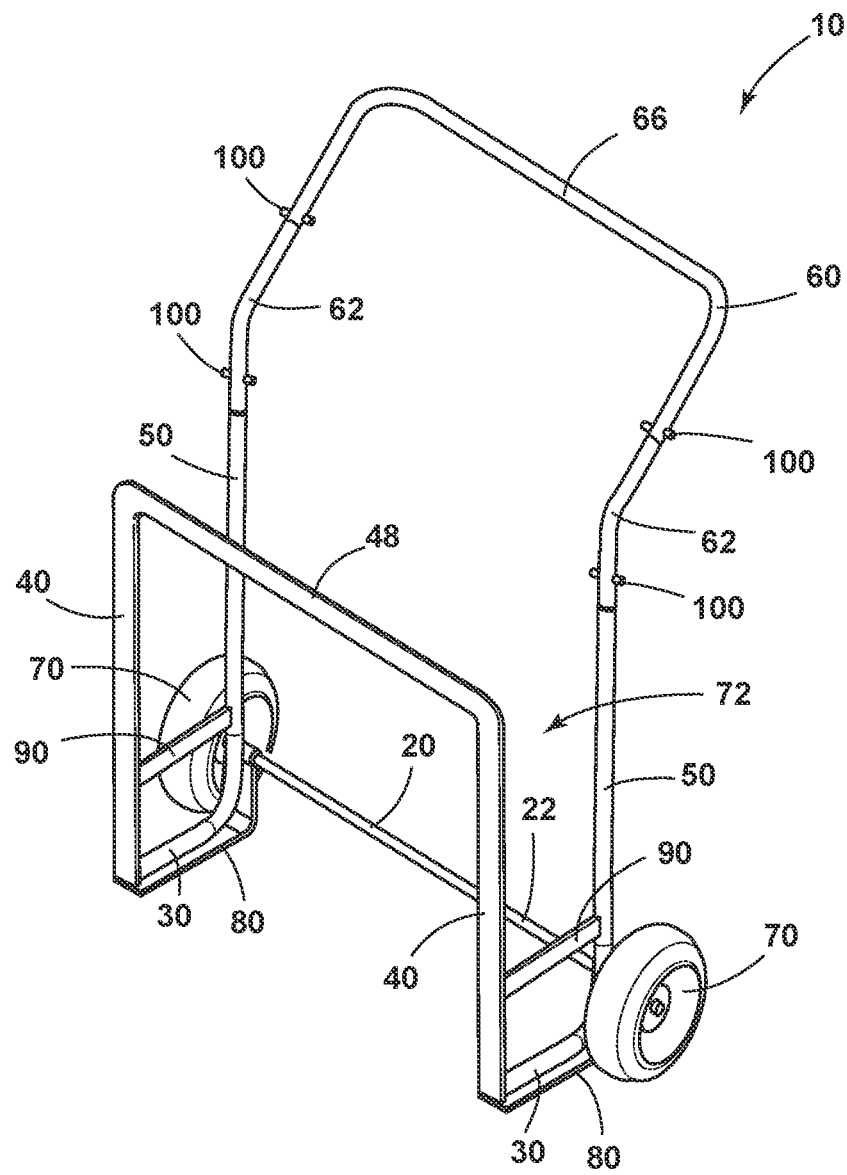
FIG. 13 is a top side perspective view of the detachable lawnmower deck cart according to another aspect of the present disclosure.

Another embodiment of the detachable lawnmower deck cart 10 may be seen in FIG. 13. In this embodiment, similar structures are also designated with similar reference characters. However, in the case of the embodiment of the detachable lawnmower deck cart 10 seen in FIG. 13, each of the pair of tubular outboard enclosure projections 40 extend orthogonally from the outboard portion of one of the pair of spaced apart intermediate members 30 and vertically upright at a right-angle relative the planar ground surface GS. In the embodiment of FIG. 13, the tubular cross-member 48 similarly operably couples the distal end 44 of each of the pair of outboard enclosure projections 40.

Figure 14:
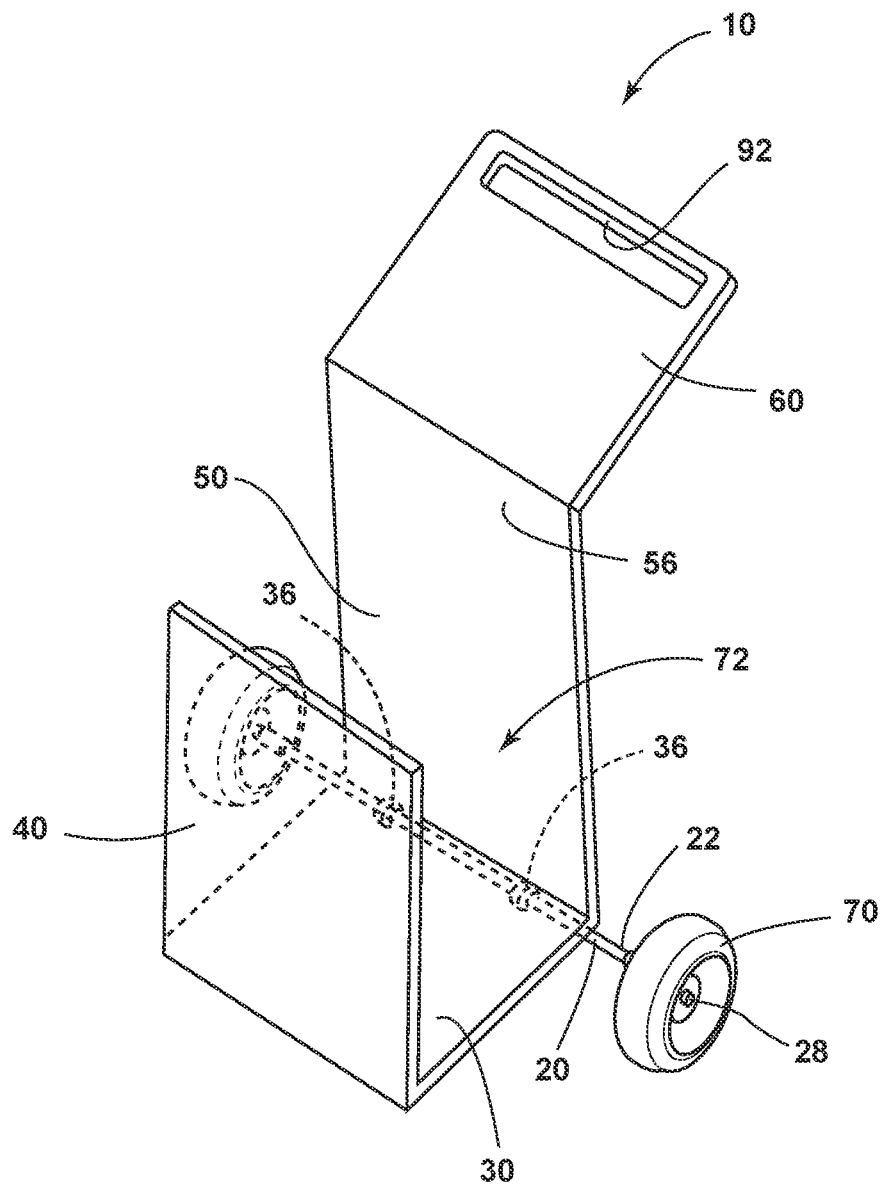
FIG. 14 is a top side perspective view of the detachable lawnmower deck cart according to a further aspect of the present disclosure.

A further embodiment of the detachable lawnmower deck cart 10 may be seen in FIG. 14. In this embodiment, similar structures are also designated with similar reference characters. In the embodiment of the detachable lawnmower deck cart 10 seen in FIG. 14, each of the intermediate member 30, the outboard enclosure projection 40, and the inboard enclosure projection 50 comprises a planar structure. Each of the outboard enclosure projection 40 and the inboard enclosure projection 50 may extend orthogonally relative to the intermediate member 30.

The inboard enclosure projection 50 may have an upper distal end 56 that is angled relative to the proximal end 52 and a handle opening 92 may be provided on the upper distal end 56 by which the detachable lawnmower deck cart 10 may be grasped and manipulated. The handle 60 may thus comprise a grip extending parallel to the transverse member 20. A bearing 36 may be fixed with a bottom surface 74 of the intermediate member 30 by which the transverse member 20 may be operably coupled with the detachable lawnmower deck cart 10. The axle 22 may thus extend from side 12 to side 14 of the detachable lawnmower deck cart 10 upon which the pair of wheels 70 are mounted on opposed ends 24, 26 of the axle 22.

Figure 15:
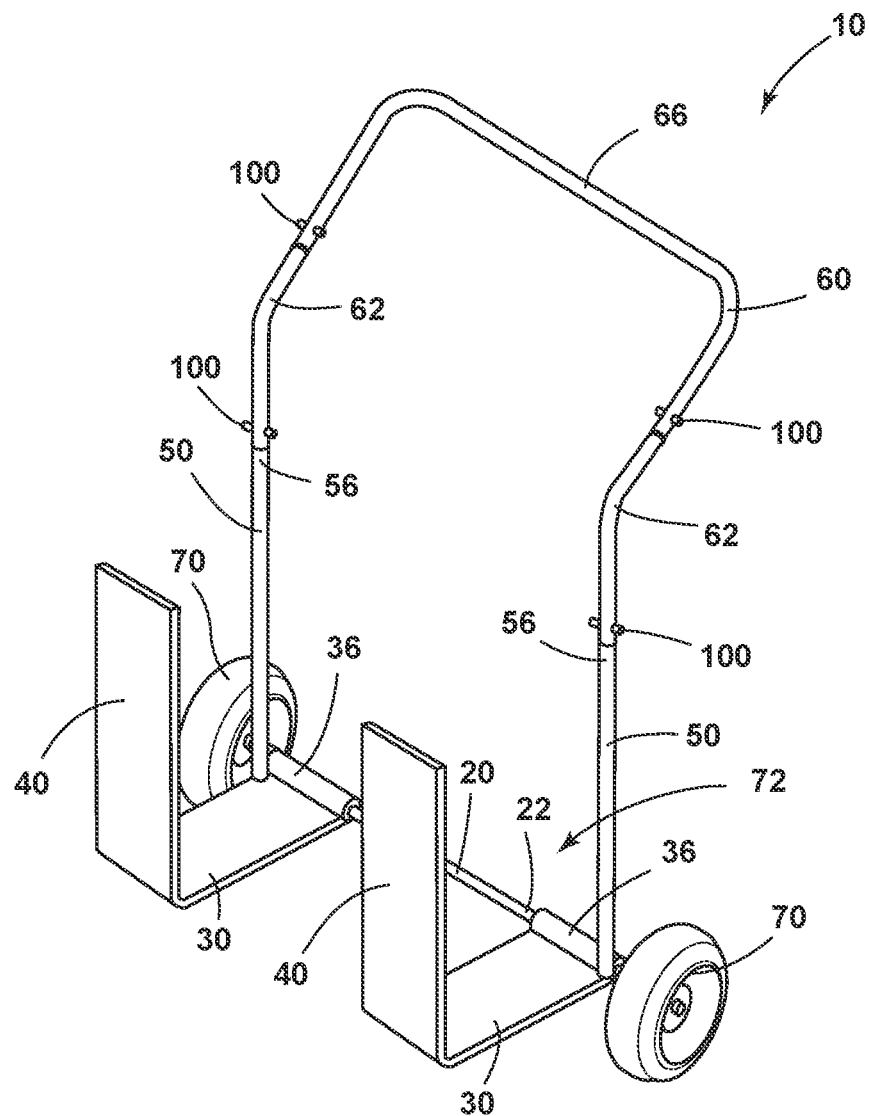
FIG. 15 is a top side perspective view of the detachable lawnmower deck cart according to yet another aspect of the present disclosure.

A final embodiment of the detachable lawnmower deck cart 10 may be seen in FIG. 15. In this embodiment, similar structures are also designated with similar reference characters. In the embodiment of the detachable lawnmower deck cart 10 seen in FIG. 15, the pair of tubular intermediate members 30 and the pair of tubular outboard enclosure projections 40 have been replaced with a pair of planar intermediate members 30 and a pair of planar outboard enclosure projections 40. The transverse member 20, comprising of axle 22, extends through a pair of bearings 36 disposed on an inboard portion 34 of each of the pair of the intermediate members 30, by which the transverse member 20 extends from side 12 to side 14 of the detachable lawnmower deck cart 10 and upon which the pair of wheels 70 are mounted on opposed ends 24, 26 of the axle 22.

The detachable lawnmower deck cart 10 disclosed herein greatly increases the convenience of moving the detachable lawnmower deck MD. Also, the detachable lawnmower deck cart 10 improves the ability to provide maintenance to the detachable lawnmower deck MD by exposing all sides of the detachable lawnmower deck MD when in the upright vertical position. Finally, the detachable lawnmower deck cart 10 facilitates storage by reducing the space used by the detachable lawnmower deck MD.

It should be understood that variations, modifications, and improvements can be made on the aforementioned detachable lawnmower deck cart 10 without departing from the concepts of the present disclosure, and further it is to be understood that such concepts are intended to be covered by the following claims unless these claims by their language expressly state otherwise.

What is claimed is:

1. A cart for moving, servicing, and storing a detachable lawnmower deck, the cart comprising:
   a transverse member;
   an intermediate member operably coupled with the transverse member;
   an outboard enclosure projection operably coupled with an outboard portion of the intermediate member and arranged orthogonally relative to the intermediate member;
   an inboard enclosure projection operably coupled at a proximal end with the transverse member or an inboard portion of the intermediate member and arranged orthogonally relative to the intermediate member, wherein the outboard enclosure projection and the inboard enclosure projection are parallelly disposed a predetermined distance from one another to define an inner space adapted to receive the detachable lawnmower deck;
   a handle operably coupled with a distal end of the inboard enclosure projection; and
   a pair of wheels operably coupled with the cart at opposed ends of the transverse member and disposed proximate the outboard portion or the inboard portion of the intermediate member by which the cart may be moved upon a planar ground surface.

2. The cart according to claim 1, further comprising a pair of spaced apart intermediate members, a pair of spaced apart outboard enclosure projections, and a pair of spaced apart inboard enclosure projections, one each of the pair of spaced apart inboard enclosure projections operably coupled at the proximal end with the inboard portion one of the pair of intermediate members, and the transverse member further comprising an axle upon which the pair of wheels are mounted on opposed ends of the axle.

3. The cart according to claim 2, wherein the pair of spaced apart outboard enclosure projections each comprise tubular members operably coupled at a proximal end to a one of the pair of spaced apart intermediate members and having a free distal end.

4. The cart according to claim 3, wherein:
   the tubular members of the pair of spaced apart outboard enclosure projections have a rectangular cross-sectional configuration and the free distal end comprises an inclined end cap; and
   the pair of spaced apart outboard enclosure projections are fabricated from aluminum and the inclined end cap is fabricated from a polymer.

5. The cart according to claim 3, wherein the pair of spaced apart inboard enclosure projections each comprises a tubular member operably coupled at the proximal end to a one of the pair of spaced apart intermediate members and wherein the handle comprises a tubular member extending between the distal ends of the pair of spaced apart inboard enclosure projections.

6. The cart according to claim 5, wherein the handle comprises a pair of angled portions each detachably coupled with the distal ends of the pair of spaced apart inboard enclosure projections at a first end and a U-shaped portion extending between and operably coupled with a second end of each of the pair of angle portions.

7. The cart according to claim 6, wherein the handle is reversibly mounted on the distal ends of the pair of spaced apart inboard enclosure projections, whereby the handle may be selectively oriented in an outboard leaning position or an inboard leaning position.

8. The cart according to claim 7, wherein the handle further comprises a double button straight leg button pins by which the handle is reversibly mounted on the distal ends of the pair of spaced apart inboard enclosure projections.

9. The cart according to claim 2, wherein each of the pair of spaced apart intermediate members and the pair of spaced apart inboard enclosure projections comprise a single integral tubular member bent at a right-angle bend.

10. The cart according to claim 9, further comprising:
    a right-angle member disposed proximate the right-angle bend and attached at a first end to a distal end of one of the pair of spaced apart intermediate members and/or spaced apart outboard enclosure projections and attached at a proximal end to one of the pair of spaced apart inboard enclosure projections; and
    an axle mount bearing disposed proximate the right-angle member and proximate the proximal end of the one of the pair of spaced apart inboard enclosure projections through which the axle is mounted to the spaced apart inboard enclosure projections proximate the planar ground surface.

11. The cart according to claim 1, wherein the intermediate member comprises a planar structure and the outboard enclosure projection comprises a planar structure extending orthogonally relative to the intermediate member.

12. The cart according to claim 11, further comprising a pair of spaced apart intermediate members and a pair of spaced apart outboard enclosure projections.

13. The cart according to claim 11, wherein the inboard enclosure projection further comprises a planar structure extending orthogonally relative to the intermediate member and the transverse member comprises an axle extending from side to side of the detachable lawnmower deck cart upon which the pair of wheels are mounted on opposed ends of the axle.

14. The cart according to claim 1, further comprising a pair of spaced apart intermediate members and wherein the outboard enclosure projection comprises a pair of tubular members and one each of the pair of tubular members extends orthogonally from the outboard portion of one of the pair of spaced apart intermediate members and inwardly at an angle relative the planar ground surface, whereby the distal ends of each of the pair of tubular members are joined.

15. The cart according to claim 14, wherein the pair of tubular members are joined at the distal end of the pair of tubular members by a horizontal tubular cross-member.

16. A method of moving, servicing, or storing a detachable lawnmower deck, the detachable lawnmower deck comprising a plurality of wheels upon which the detachable lawnmower deck may be rolled over a planar ground surface, the method comprising the steps of:

provide a cart having a transverse member, a pair of intermediate members operably coupled with the transverse member, a pair of outboard enclosure projections operably coupled with an outboard portion of the intermediate member and arranged orthogonally relative to the intermediate member, and a pair of inboard enclosure projections operably coupled at a proximal end with the transverse member or an inboard portion of the intermediate member and arranged orthogonally relative to the intermediate member proximate the detachable lawnmower deck, wherein the outboard enclosure projection and the inboard enclosure projection are parallelly disposed a predetermined distance from one another to define an inner space adapted to receive the detachable lawnmower deck;

placing the cart on a first side, wherein the pair of outboard enclosure projections is proximate to and parallel with the planar ground surface;

rolling the detachable lawnmower deck over the pair of outboard enclosure projections and into the inner space adapted to receive the detachable lawnmower deck until the detachable lawnmower deck is proximate the pair of intermediate members;

lifting a handle operably coupled with a distal end of the pair of inboard enclosure projections until the cart is in an upright vertical position; and moving the detachable lawnmower deck and the cart upon the planar ground surface via the handle and a plurality of wheels operably coupled with the cart at opposed ends of the transverse member and disposed proximate the inboard edge of the pair of intermediate members.

17. The method of claim 16, further comprising the step of:

tilting the handle and the pair of plurality of inboard enclosure projections at an angle with respect to the planar ground surface, whereby the plurality of wheels may be used to facilitate movement of the detachable lawnmower deck and the cart.

18. The method of claim 16, wherein the handle operably coupled with the distal end of the pair of inboard enclosure projections is reversibly mounted on the distal ends of the pair of inboard enclosure projections, and the method further comprising the steps of:

selectively orienting the handle in an outboard leaning position for storage of the detachable lawnmower deck; or selectively orienting the handle in an inboard leaning position for movement of the detachable lawnmower deck.

\* \* \* \* \*